UNITED STATES PATENT OFFICE.

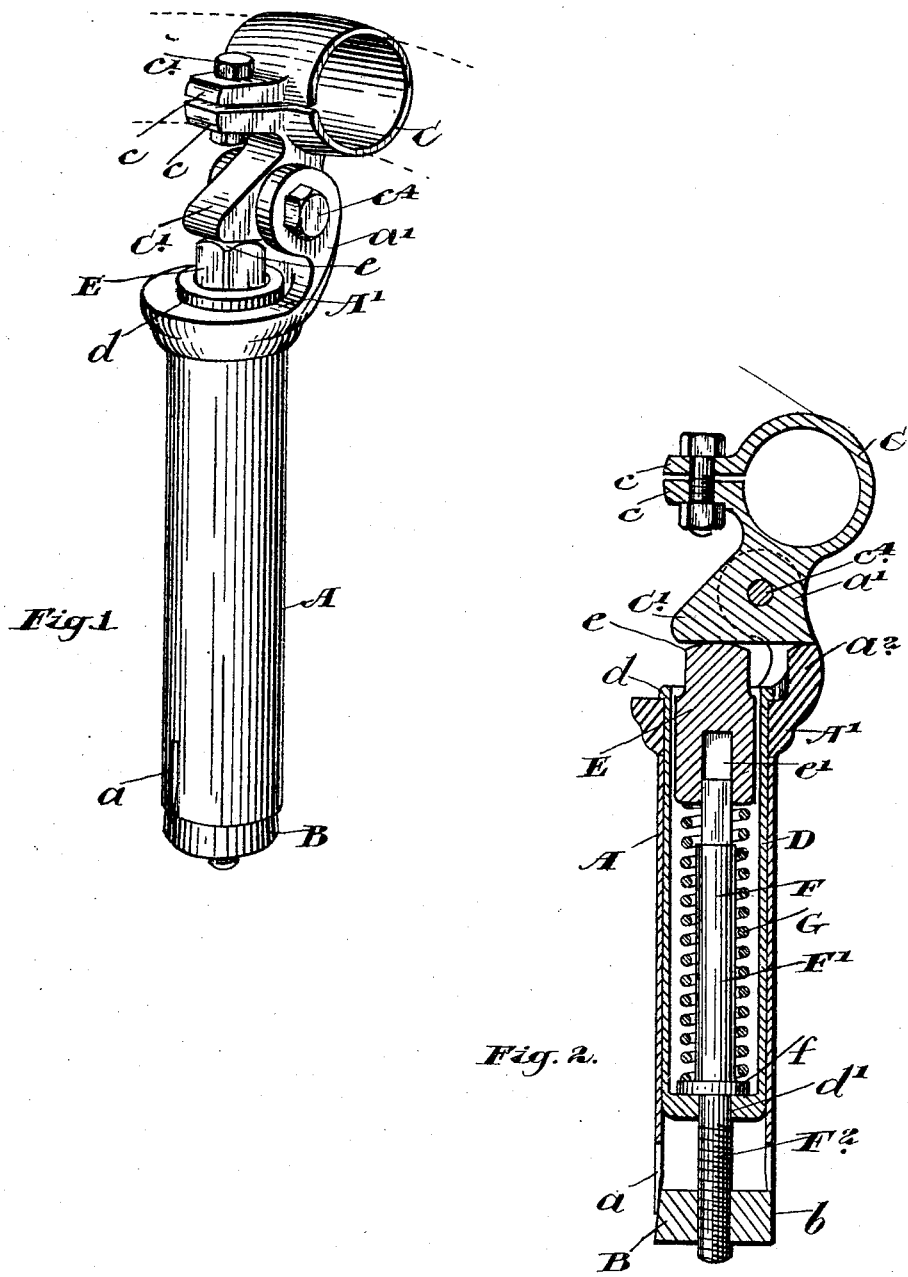

SAMUEL ANGROVE, OF KINGSTON, CANADA.

BICYCLE HANDLE-BAR.

No. 797,041.  Specification of Letters Patent.  Patented Aug. 15, 1905.

Application filed December 15, 1904. Serial No. 236,994.

*To all whom it may concern:*

Be it known that I, SAMUEL ANGROVE, of the city of Kingston, in the county of Frontenac, in the Province of Ontario, Canada, have invented certain new and useful Improvements in Bicycle Handle-Bars, of which the following is a specification.

My invention relates to improvements in bicycle handle-bars; and the object of the invention is to devise a bicycle handle-bar so disposed and supported on the top of the stem or standard as to give a maximum resiliency and produce an effective cushion for preventing the jar on the rider's hands; and it consists, essentially, of a split sleeve in which the handle-bar is centrally located, the said split sleeve being provided with a depending cam extending over the center of the stem, a collar having an upwardly-extending jaw within which the cam extends, and a pin extending through the jaw and cam and forming a pivot for the cam, an interior socket fitting within the stem and cap and having at the upper end a supporting-rim, a plug extending into the upper end of the socket and located underneath the cam, an expanding-plug fitting into the lower end of the stem, a spindle provided with a square upper end fitting into a corresponding socket in the plug and having the lower end extending freely through the bottom of the tubular socket and threaded beneath the bottom of the socket and extending into the expanding-plug, and a spiral spring surrounding the spindle and extending between the plug and the bottom of the socket-sleeve, the parts being otherwise constructed and arranged in detail, as hereinafter more particularly explained.

Figure 1 is a perspective view of a handle-bar constructed in accordance with my invention. Fig. 2 is a sectional elevation.

In the drawings, like letters of reference indicate corresponding parts in each figure.

A is the stem, which fits into the upper end of the front standard of the bicycle. The stem A is split at $a$ at the lower end and provided with an expansion-plug B, which is tapered, as shown in Fig. 2. The upper end of the stem A has preferably suitably brazed to it a collar A', having the upper upwardly-extending side jaws $a'$, having a stop $a^2$ formed between the jaws for a purpose which will hereinafter appear.

C is a split sleeve, the forward lugs $c\ c$ of which are connected together by a suitable bolt $c'$. The split sleeve C is provided with a depending cam C', substantially triangular in form. The cam projection C' extends between the jaws $a'$ and is pivotally held therein by a pin $c^4$, extending through the jaws and through the cam. The stop $a^2$ abuts the outer straight edge of the cam C' and is designed to limit the backward movement of the sleeve C.

D is a tubular socket which fits within the stem A and is provided at the upper end with a rim $d$, by which it is held from vertical displacement.

E is a plug provided with a rounded upper end $e$, which is square in cross-section or sided so as to allow of its being turned by a wrench. The plug E is provided with sockets $e'$ at the lower end, as indicated, and the plug E is so fitted into the tubular socket D as to have vertical movement therein.

F is a spindle which is provided with a square upper end designed to fit into the socket $e'$ of the plug E, an enlarged central portion F', designed to form a shoulder, so as to abut against the bottom of the tubular socket around the hole $d'$ therein, and a reduced lower portion F², which extends freely through the hole $d'$ and is threaded at the lower end so as to extend through a correspondingly-threaded hole in the expansion-plug B.

The plug B is provided with a key $b$, attached to or forming part of the same, which fits into one of the slits $a$ in the stem A, and thereby prevents the plug from rotating.

The object of the expansion-plug is, as is well known, to provide for sufficient expansion within the head or standard of the bicycle in order to provide for the necessary vertical adjustment of the handle-bar.

$f$ is a collar which is attached to or forms part of the spindle F.

G is a spiral spring surrounding the spindle F and extending between the bottom of the plug E and the collar F.

The operation of my invention will be readily understood. Any pressure upon the handle-bars will throw the part C to the left, and this will throw a forward and downward pressure on the cam C', which pressure will be communicated to the plug E and be received on the spring G, which, it will be noticed, is held away from any liability of contact with the interior of the tubular socket D by means of the spindle F, so that the spring has perfect freedom to expand diametrically and this, too, without the liability of impinging on the stem to any extent as will be likely to prevent the spring forming an effective cushion.

I am aware that it is not broadly new to support a handle-bar resiliently in a tubular socket at the top of the head of the front standard of a bicycle, nor provide means for manipulating the expansion-plug so as to provide for the vertical adjustment of a handle-bar, and I do not wish in this specification to claim, broadly, any such device.

What I claim as my invention is—

1. In a bicycle handle-bar, the combination with the stem and upper collar attached to or forming part of the same and provided with upwardly-extending jaws and the tubular socket fitting into the stem and provided with a top rim by which it is supported on the top of the stem and an extension-plug extending into the bottom of the stem, and a split sleeve adapted to receive the handle-bar and provided with a depending cam-shaped portion adapted to extend for the major portion above the stem and having a back-stop designed to contact with the stop between the jaws, of a plug fitting within the upper portion of the tubular socket and having the upper end rounded and adapted to receive a wrench, and a socket in the lower end, a stem having a square or like upper end adapted to fit in the socket in the plug and a central enlarged portion, and a reduced lower end designed to extend freely through the bottom of the tubular socket and having a thread beneath the socket designed to extend into a corresponding hole in the extension-plug and a spiral spring surrounding the stem and extending between the bottom of the plug and the bottom of the tubular socket as and for the purpose specified.

2. In a bicycle handle-bar, the combination with the stem and upper collar attached to or forming part of the same and provided with upwardly-extending jaws and the tubular socket fitting into the stem and provided with a top rim by which it is supported on the top of the stem and an extension-plug extending into the bottom of the stem, and a split sleeve adapted to receive the handle-bar and provided with a depending cam-shaped portion adapted to extend for the major portion above the stem and having a back-stop designed to contact with the stop between the jaws, of a plug fitting within the upper portion of the tubular socket and having the upper end rounded and adapted to receive a wrench, and a socket in the lower end, a stem having a square or like upper end adapted to fit in the socket in the plug and a central enlarged portion, and a reduced lower end designed to extend freely through the bottom of the tubular socket and having a thread beneath the socket designed to extend into a corresponding hole in the extension-plug, a collar located on the spindle above the bottom of the tubular socket and a spiral spring surrounding the stem and extending between the bottom of the plug and the collar on the stem as and for the purpose specified.

SAMUEL ANGROVE.

Witnesses:
D. M. McIntyre,
John McIntyre.